Jan. 20, 1959   W. A. MORTON ET AL   2,869,627
RECUPERATIVE FURNACES
Filed March 14, 1955
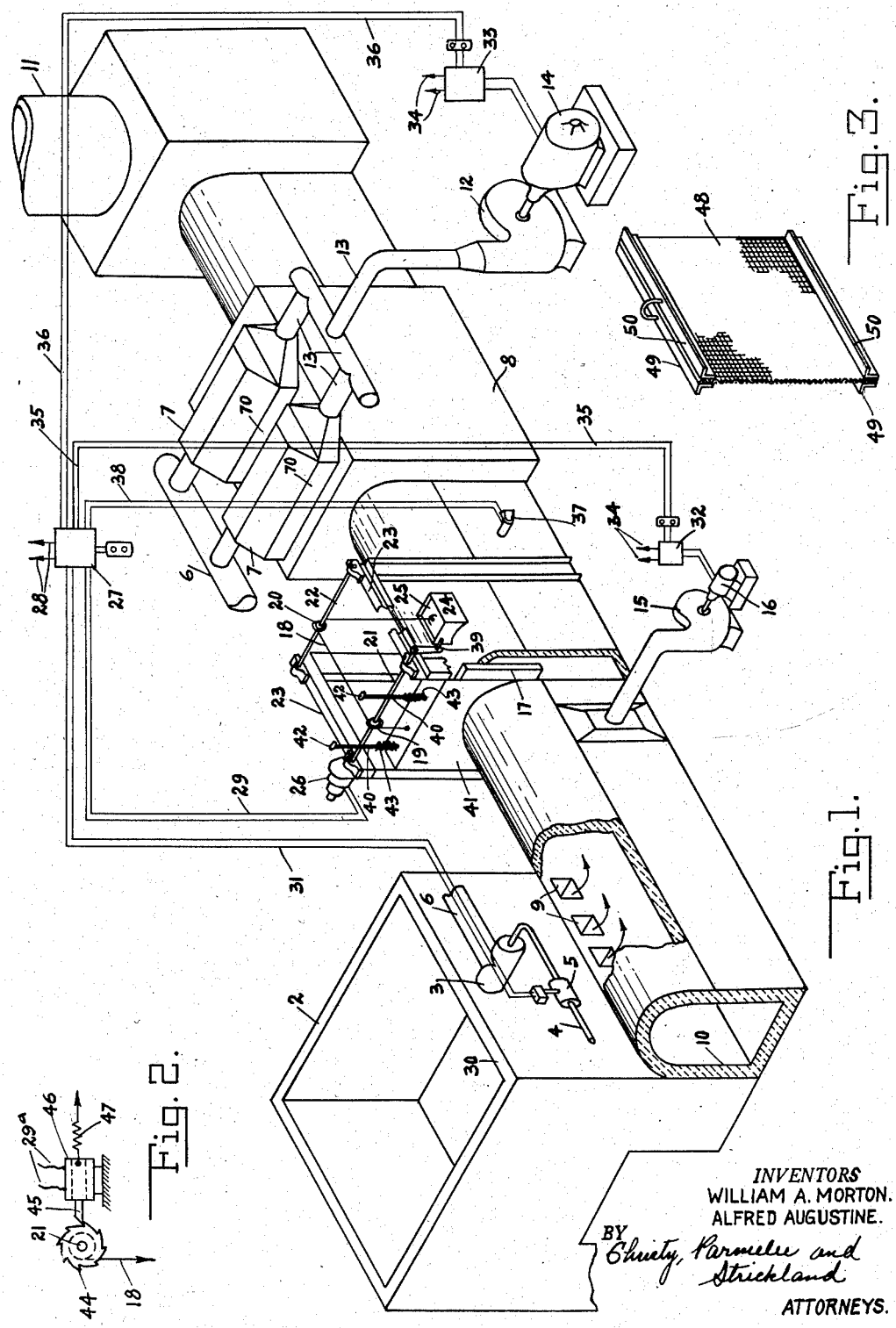
INVENTORS
WILLIAM A. MORTON.
ALFRED AUGUSTINE.
BY *Christy, Parmelee and Strickland*
ATTORNEYS.

United States Patent Office 2,869,627
Patented Jan. 20, 1959

2,869,627

RECUPERATIVE FURNACES

William A. Morton, Mount Lebanon and
Alfred Augustine, Dormont, Pa.

Application March 14, 1955, Serial No. 493,892

8 Claims. (Cl. 158—4.5)

This invention relates to industrial fuel-fired furnaces having recuperators for preheating the combustion air. More particularly, the invention relates to furnaces having metallic recuperators, and the invention consists in certain new and useful improvements in means for safeguarding such recuperators from excessive and harmful temperatures.

Various forms of metallic recuperators are known to the art. Briefly, a recuperator of the sort in mind comprises a multiplicity of recuperator elements formed of metal, usually a ferrous alloy including chromium and nickel in proportions that render the bodies of the elements resistant to high temperatures, and to the chemical effects of the hot products of combustion of the furnace. The recuperator elements are mounted athwart the path of the hot products of combustion or waste gases flowing from the furnace to a stack or other outlet, and such gases envelope and stream over the external surfaces of the metallic elements of the recuperator. The recuperator elements include internal passages through which the air for the combustion of fuel in the furnace is caused to flow, and in such flow the air absorbs through the metal walls of the elements great quantities of heat released by the hot waste gases. The heated air is led from the recuperator to a burner that directs the fuel with such heated air into the furnace. Better thermal efficiency and more satisfactory furnace operation are thus realized.

The flow of air through the recuperator elements is promoted by electrically driven blowers included in the combustion system of the furnace, and the design of such system for a given furnace is so determined that, during normal furnace operation, the heat removed by the combustion air flowing through the recuperator, will be at such rate that the metallic parts of the recuperator will not be heated to a dangerous or harmful temperature.

If for any reason the rate or intensity of heat delivery by the hot waste gases to the recuperator becomes excessive with respect to rate of heat removal by the combustion air, the metallic recuperator elements will quickly become overheated and damaged. Furthermore, if the electrical power should fail, resulting in a shut-down of the air fans or blowers, the recuperator elements will be quickly damaged by the high temperatures to which such elements will immediately rise. With these circumstances in mind, it will be understood that the object of the invention is to provide in combination with the combustion system of an industrial furnace improved and economical apparatus for automatically protecting a recuperator from damaging thermal conditions. Other objects are inherent in the following context.

In the accompanying drawings:

Fig. 1 illustrates diagrammatically in perspective a recuperative furnace installation incorporating the invention, portions of the installation being broken away for clarity of illustration;

Fig. 2 is a fragmentary diagrammatic view, illustrating a modification in a part of the installation; and Fig. 3 is a view in perspective of a modified form of damper or thermal shield embodied in the recuperator protecting apparatus of the invention.

Referring to the drawing, the reference numeral 2 indicates a soaking pit furnace, in which steel ingots are heated to rolling or forging temperature. A soaking pit furnace will suffice for illustration of a typical embodiment of the invention, and with it those skilled in the art will understand how the invention may be practiced in any sort of furnace having thermally vulnerable recuperator elements. The showing of the furnace herein is schematic, from which the removable cover of the furnace has been omitted for convenience in illustration.

As is usual the pit furnace is provided with burner means for firing. In this case a single burner 3 is provided, and such burner may be located near the top and centrally of one end wall 30 of the pit, and fluid fuel is delivered to the burner by way of a pipe 4, controlled by an electro-magnetic valve 5, or a pneumatic valve which is electro-magnetically controlled. The air for combustion is delivered to the burner through a duct 6 leading from the upper compartments 7 of the headers of a metallic recuperator located within a recuperator chamber 8. The burner directs a burning column of fuel and preheated air into the top of the furnace, wherein the required thermal head is developed to heat the steel ingots, or other work, to be heated in the furnace. The hot waste gases or products of combustion of the furnace emerge through outgo ports 9 that open through the lower portion of the end wall 30 into a flue 10 leading to a stack 11. Automatic devices (not shown) for regulating the ratio of the air to the fuel flowing to the burner are provided, together with means for regulating the rate of flow of the proportioned fuel and air at such value as to develop the required furnace temperatures, but it is needless to involve this specification with a description of the structure and operation of these devices and means, which are well known to the art.

In the chamber 8 any desired form of metallic recuperator may be installed, and here too it is needless to involve this specification or the drawing with any particular form of metallic recuperator. Suffice it to say that a recuperator embodying a system of metallic tubes are mounted in the chamber 8, whereby the hot waste gases of the furnace passing through flue 10 to stack 11 flow over, around and between the outer surfaces of the tubes. Such a recuperator as that illustrated and described in U. S. Letters Patent No. 2,332,450, granted October 19, 1943 to G. D. Mantle, has been used in the practice of our invention. The combustion air for the furnace is delivered by a blower 12 through ducts 13 into the lower compartments 70 of the recuperator headers, which lower compartments stand in open communication with the inlet ends of the recuperator tubes. The air propelled by fan 12, which is driven by an electric motor 14, flows into and through the recuperator tubes, wherein it is heated by the hot waste gases streaming over the external surfaces of the tubes and yielding large quantities of heat thereto. The heated air enters the upper compartments 7 of the headers, which are in open communication with the outlet ends of the recuperator tubes. As already mentioned the heated air is fed from compartments 7 to the burner 3 by way of the duct 6.

In the drawing it will be noted that the left-hand end of the flue 10 is open, to indicate that a plurality of soaking pit furnaces may be connected to discharge their hot waste gases into the flue. In such case the recuperator 8 will be designed to heat the combustion air for all furnaces connected to the flue. On the other hand, if only one furnace, as shown, is connected to the flue the left-hand end of the flue will be closed.

It will be understood that the waste gases delivered by the furnace, or furnaces, connected to the flue system will, during certain periods of furnace operation, be at a temperature too high for the metallic recuperator elements to withstand, even when the air to be heated is flowing through the recuperator at normal rate. In order to safeguard the recuperator elements against excessive waste gas temperatures means are provided for tempering or partially cooling the waste gases flowing to the recuperator. Such means may comprise a fan 15, driven by an electric motor 16, for delivering cool air from the open atmosphere into the waste gases in the flue, whereby the mean temperature of the waste gases is reduced to and held at a safe value.

In accordance with the present invention, means are provided, in combination with the assembly described, for automatically protecting the recuperator from harm, either in the event that the electric power should fail and thereby deprive the recuperator from the cooling effects of the air delivered by the electrically driven fans 12 and 15, or in the event that for any other reason the temperature to which the recuperator is exposed exceeds a safe value. The means to this end comprise an air inlet 24 and a steel damper-shield 17, suspended by a cable 18 trained over pulleys or drums 19 and 20 on shafts 21 and 22, respectively, which are rotatably borne on a steel supporting structure 23. The air inlet 24 is in this case provided in the roof of the flue, and the flow of air from the outer atmosphere through this inlet is normally blanked or obstructed by means of a saucer valve 25. The remote end of cable 18 is mechanically connected to the valve 25, and the arrangement is such that the tendency is for the damper-shield 17 to move into closed position. This tendency is normally opposed by a magnetic brake 26, which, electrically energized by a circuit 29 leading through a holding relay 27 from 110-volt power lines 28, locks the shaft 21 and its pulley or drum 19 against rotation, wherefore the damper-shield is normally secured in elevated or open position, allowing the normal flow of gases through the flue 10. When there is a failure of electrical power, resulting in the opening of circuit-breakers 32 and 33 in a 440-volt power supply circuit 34, and in an interruption in the operation of air fans 12 and 15, the holding relay 27 opens, whereby the magnetic brake 26 is released and the damper-shield 17 drops into closed position, blanking the flow of waste gases through the flue 10, and opening the air-inlet valve 25. The opening of saucer valve 25 allows cool air from the outer atmosphere to be drafted through the recuperator by the stack 11. No harm will thus come to the vulnerable recuperator elements.

Simultaneously with the opening of the holding relay 27 the following companion operations take place:

(1) The electrical power that is received through holding relay 27 and circuit 31 is cut-off from the magnetically operated fuel-valve 5, and such valve closes shutting off the flow of fuel to the furnace.

(2) The holding relay 27 opens interlocking circuits 35 and 36 of the circuit-breakers 32 and 33 of the fan motors. The opening of these interlocking circuits necessitates that, after electric power has been restored, the holding relay 27 must be manually reclosed before the power circuits can be restored through relays 32 and 33 to restart the air fans.

A thermally responsive relay or fuse-contactor 37 is mounted in the wall of the flue 10, and the contacts of this relay are connected by a circuit 38 to the holding relay 27. The circuit 38 must be closed and remain closed in the thermal relay 37 in order for the circuits 29, 31, 35 and 36 to be closed and held through the holding relay 27. The thermal relay 37 remains closed and the operation of the furnace is uninterrupted, so long as the temperature of the waste gases in the flue remains below a value that is dangerous to the recuperator elements.

It will be understood, therefore, that in the event of a power failure, or in the event that the gases in the flue rise to an excessive or dangerous temperature, the damper-shield 17 will close, the valve 25 will open, the fuel flow to the furnace will cease, and the operation of the fans 12 and 15 will stop. When conditions for normal furnace operation have been restored, the damper-shield 17 is raised into open position, and the saucer valve 25 is closed by means of a hand-crank 39 on the shaft 21, where such shield is secured by the ten-energized magnetic brake 26.

The damper-shield 17 is provided with a pair of rods 40, which extend with sliding fit upwardly through a housing 41 built upon the top of the flue, and on the upper end of each rod 40 a head 42 is provided. Upon the body of each rod 40 a helical compression spring 43 is provided, in such organization that, when the magnetic brake is de-energized and the damper-shield drops into closed position, the heads 42 on the rods will engage the springs 43 and restrain the damper from violently striking the bottom of the flue.

In certain installations safe protection for the recuperator elements is obtained without the use of the damper-shield 17; that is, the automatic and prompt opening of the saucer valve 25, admitting relatively cool outside air to the flue gases flowing to the recuperator, provides all of the thermal protection required for the recuperator. When the damper-shield 17 is omitted the supporting cable 18 is suitably counterweighted.

In modification of the electro-magnetic brake 26, the shaft 21 may be equipped with a rachet wheel 44, as shown in Fig. 2. A pawl 45 is arranged to engage the rachet wheel and to secure the shaft 21 against rotation, whereby the damper-shield 17 is held in open or elevated position. The pawl 45 may comprise the movable armature of an electric solenoid 46, which is normally energized through a circuit 29a leading from the holding relay 27. During normal furnace operation the solenoid 46 remains energized and serves to hold the pawl 45, against the restraint of a spring 47, in engagement with the rachet wheel 44. When the holding relay 27 opens, upon the happening of any of the contingencies mentioned in the foregoing specification, the solenoid 46 is de-energized and the spring 47 becomes effective to withdraw the pawl 45 from engagement with the rachet wheel 44, in consequence of which the shaft 21 is released and the damper-shield 17 descends into closed position and the saucer valve 25 rises into open position, while the fuel flow is shut-off and the operation of the air fans is arrested. The furnace may be returned to operation substantially in the manner described, after proper conditions for such operation have been restored.

An important modification is shown in Fig. 3; that is to say, the damper or thermal shield (17) may be advantageously constructed of a web of heat-resisting fabric 48, say of steel or alloy mesh, secured at its upper and lower edges between metal angles 49 and 50. In this modified form of thermal shield or damper, the problem of distortion of the damper structure is avoided. In lieu of metal mesh the damper may be constructed of a metal plate whose body is perforated with a multiplicity of closely spaced holes or slots, whereby the difference in temperature between the opposite faces of the damper in service is minimized, and to such extent the perforate metal plate is the equivalent of a web of metal mesh.

Within the terms of the appended claims various other modifications may be made by the engineer, without departing from the spirit of the invention disclosed herein.

We claim:

1. In an industrial furnace having burner means arranged to deliver fluid fuel for combustion in the furnace, a stack, a flue system for the hot products of combustion leading from said furnace to the stack, a recuperator arranged between the furnace and the stack in the path of the hot products of combustion flowing from the furnace through said flue system, means effective between the furnace and the recuperator for tempering the hot products of combustion flowing in the flue system, an electrically driven blower for propelling combustion air through said recuperator, a duct for delivering preheated combustion air from the recuperator to said furnace, a thermal shield normally sustained in withdrawn position in said flue at a point between said furnace and said recuperator, an air inlet having a valve normally positioned to obstruct flow of air from the outer atmosphere into said flue system at a point between said furnace and said recuperator, means for moving said thermal shield from withdrawn position and for opening said air valve from flow-obstructing position, and means responsive to an excessive temperature in said flue system for actuating said last-mentioned means.

2. An industrial furnace installation comprising a plurality of furnaces, burner means arranged to deliver fluid fuel for combustion in each of said furnaces, a stack, a flue system for leading hot products of combustion from said furnaces to said stack, a recuperator arranged in the flue system in the path of the hot products of combustion flowing from said furnaces to said stack, means effective between the furnaces and the recuperator for tempering the hot products of combustion flowing in the flue system, an electrically driven blower for propelling combustion air through said recuperator, a duct for leading preheated combustion air from the recuperator to said furnaces, a thermal shield sustained in withdrawn position in said flue at a point between said furnaces and said recuperator, an air inlet having a valve normally positioned to obstruct flow of air from the outer atmosphere into said flue system at a point between said furnaces and said recuperator, means for moving said thermal shield from withdrawn position and for opening said air valve from flow-obstructing position, and means responsive to an excessive temperature in said flue system for actuating said last-mentioned means.

3. In an industrial furnace having burner means arranged to deliver fluid fuel for combustion in the furnace, a stack, a flue system for the hot products of combustion leading from said furnace to the stack, a recuperator arranged between the furnace and the stack in the path of the hot products of combustion flowing from the furnace through said flue system, means comprising an electrically driven air blower effective between the furnace and the recuperator for tempering the hot products of combustion flowing in the flue system, an electrically driven blower for propelling combustion air through said recuperator, a duct for delivering preheated combustion air from the recuperator to said furnace, an air inlet having a valve normally positioned to obstruct flow of air from the outer atmosphere into said flue system at a point between said furnace and said recuperator, a device for opening said air valve from flow-obstructing position, and means responsive to a failure of the electric power supplied to said blowers for actuating said device.

4. The structure of the next-preceding claim, together with means responsive to an excessive temperature in said flue system for actuating said device irrespective of the occurrence of a power failure.

5. An industrial furnace installation comprising a plurality of furnaces, burner means arranged to deliver fluid fuel for combustion in each of said furnaces, a stack, a flue system for leading hot products of combustion from said furnaces to said stack, a recuperator arranged in the flue system in the path of the hot products of combustion flowing from said furnaces to said stack, means comprising an electrically driven air blower effective between the furnaces and the recuperator for tempering the hot products of combustion flowing in the flue system, an electrically driven blower for propelling combustion air through said recuperator, a duct for leading preheated combustion air from the recuperator to said furnaces, a thermal shield sustained in withdrawn position in said flue at a point between said furnaces and said recuperator, an air inlet having a valve normally positioned to obstruct flow of air from the outer atmosphere into said flue system at a point between said furnaces and said recuperator, means for moving said thermal shield from withdrawn position and for opening said air valve from flow-obstructing position, and means responsive to a failure of electric power supplied to said blower for actuating said last-mentioned means.

6. The structure of the next-preceding claim, together with means responsive to an excessive temperature in said flue system for actuating the shield-moving and air valve-opening means irrespective of the occurrence of a power failure.

7. In an industrial furnace having a burner means arranged to deliver fluid fuel for combustion in the furnace, a stack, a flue system for the hot products of combustion leading from said furnace to the stack, a recuperator arranged between the furnace and the stack in the path of the hot products of combustion flowing from the furnace through said flue system, an electrically driven blower for propelling combustion air through said recuperator, a duct for delivering preheated combustion air from the recuperator to said furnace, a thermal shield normally sustained in withdrawn position in said flue at a point between said furnace and said recuperator, an air inlet having a valve normally positioned to obstruct flow of air from the outer atmosphere into said flue system at a point between said furnace and said recuperator, means for moving said thermal shield from withdrawn position and for opening said air valve from flow-obstructing position, and means responsive to an excessive temperature in said flue system for actuating said last-mentioned means.

8. An industrial furnace installation comprising a plurality of furnaces, burner means arranged to deliver fluid fuel for combustion in each of said furnaces, a stack, a flue system for leading hot products of combustion from said furnaces to said stack, a recuperator arranged in the flue system in the path of the hot products of combustion flowing from said furnaces to said stack, an electrically driven blower for propelling combustion air through said recuperator, a duct for leading preheated combustion air from the recuperator to said furnaces, a thermal shield sustained in withdrawn position in said flue at a point between said furnaces and said recuperator, an air inlet having a valve normally positioned to obstruct flow of air from the outer atmosphere into said flue system at a point between said furnaces and said recuperator, means for moving said thermal shield from withdrawn position and for opening said air valve from flow-obstructing position, and means responsive to a failure of electric power supplied to said blower for actuating said last-mentioned means.

References Cited in the file of this patent

UNITED STATES PATENTS

| | | |
|---|---|---|
| 1,413,122 | Kay | Apr. 18, 1922 |
| 1,921,507 | Culbertson | Aug. 8, 1933 |
| 1,927,215 | Peebles | Sept. 19, 1933 |
| 1,963,640 | Alexander | June 19, 1934 |
| 2,485,306 | Myers | Oct. 18, 1949 |
| 2,675,707 | Brown | Apr. 20, 1954 |